(12) United States Patent
Fang et al.

(10) Patent No.: US 12,008,819 B2
(45) Date of Patent: Jun. 11, 2024

(54) NAVIGATION SYSTEM WITH MONO-CAMERA BASED TRAFFIC SIGN TRACKING AND POSITIONING MECHANISM AND METHOD OF OPERATION THEREOF

(71) Applicant: TeleNav, Inc., Santa Clara, CA (US)

(72) Inventors: Hui Fang, Shanghai (CN); Congmin Bai, Shanghai (CN); Lina Hu, Shanghai (CN)

(73) Assignee: Telenav, Inc., Santa Clara, CA (US)

( * ) Notice: Subject to any disclaimer, the term of this patent is extended or adjusted under 35 U.S.C. 154(b) by 394 days.

(21) Appl. No.: 17/394,112

(22) Filed: Aug. 4, 2021

(65) Prior Publication Data
US 2023/0044819 A1 Feb. 9, 2023

(51) Int. Cl.
*G06V 20/58* (2022.01)
*G01C 21/36* (2006.01)
*G06V 20/56* (2022.01)

(52) U.S. Cl.
CPC ........ *G06V 20/582* (2022.01); *G01C 21/3623* (2013.01); *G01C 21/3632* (2013.01); *G01C 21/3673* (2013.01); *G06V 20/588* (2022.01)

(58) Field of Classification Search
CPC .... G06V 20/582; G06V 20/588; G06V 10/82; G06V 20/58; G06V 20/59; G06V 20/56; G06V 20/52; G06V 20/584; G06V 10/40; G06V 10/443; G06V 10/75; G06V 10/764; G06V 20/54; G06V 20/63; G06V 20/64; G06V 30/10; G06V 40/172; G06V 30/224; G01C 21/3623; G01C 21/3632; G01C 21/3673; G01C 21/3602; G01C 21/3647; G01C 21/36; G01C 15/06; G01C 21/34; G01C 21/3638; G01C 21/3492; G01C 15/04; G01C 21/362; G01C 21/3644; G01C 21/365; G01C 21/3658; G01C 21/3819; G01C 21/3635; G01C 21/3896; G01C 22/00; G01C 23/00; G08G 1/09623; G08G 1/0969; G08G 1/052; G08G 1/167; G08G 1/095; B60W 2420/52; B60W 10/06; B60W 10/20; B60W 50/14; B60W 2050/146; B60W 2555/60; B60W 2556/50; B60W 2710/18; B60W 2710/20; B60W 30/02;
(Continued)

(56) References Cited

U.S. PATENT DOCUMENTS 8,559,673 B2  10/2013 Fairfield et al.
8,643,721 B2  2/2014 Becker
(Continued)

*Primary Examiner* — Nimesh Patel
(74) *Attorney, Agent, or Firm* — Perspectives Law Group, Corp.

(57) ABSTRACT

A method of operation of a navigation system comprising: receiving multiple frames, including a first frame and a second frame, of images; detecting a traffic sign from the images between the first frame and the second frame based on a sign recognition model; extracting a first image from the first frame and a second image from the second frame; matching the traffic sign is the same in the first image and the second image based on a similarity model; generating a sign location of the traffic sign with an inertial measurement unit reading based on the first image and the second image; and generating a global coordinate for the sign location for displaying on a navigation map.

17 Claims, 8 Drawing Sheets

(58) Field of Classification Search
CPC ........... B60W 40/06; B60W 2420/403; B60W 2420/42; B60W 2552/53; G05D 1/0236; G05D 1/0246; G05D 1/0278; G05D 1/0287; G05D 1/021; G05D 1/0219; G05D 1/0221; G05D 1/0253; G05D 1/0223; G05D 1/0214; G05D 1/0251; G05D 1/0257

See application file for complete search history.

(56) References Cited

U.S. PATENT DOCUMENTS

| | | |
|---|---|---|
| 9,373,041 B2 | 6/2016 | Stahlin |
| 9,409,571 B2 | 8/2016 | Lueke et al. |
| 9,697,430 B2 | 7/2017 | Kristensen |
| 9,734,415 B2 | 8/2017 | Mitoma et al. |
| 9,792,511 B2 | 10/2017 | Behrens |
| 2006/0034484 A1* | 2/2006 | Bahlmann ............ G06V 10/56 382/104 |
| 2010/0283855 A1 | 11/2010 | Becker |
| 2011/0109476 A1* | 5/2011 | Porikli ................ G06F 18/214 340/905 |
| 2011/0182475 A1 | 7/2011 | Fairfield et al. |
| 2013/0253754 A1* | 9/2013 | Ferguson ............ G05D 1/0231 701/28 |
| 2014/0085428 A1 | 3/2014 | Stahlin |
| 2015/0092988 A1 | 4/2015 | Mitoma et al. |
| 2015/0105989 A1 | 4/2015 | Lueke et al. |
| 2016/0026882 A1 | 1/2016 | Behrens |
| 2017/0017849 A1 | 1/2017 | Kristensen |
| 2017/0154229 A1* | 6/2017 | Yoshitomi ............ G06V 20/582 |
| 2019/0122550 A1* | 4/2019 | Muehlmann ..... G08G 1/096725 |
| 2019/0195649 A1* | 6/2019 | Chang .................... G06T 7/337 |
| 2019/0272435 A1* | 9/2019 | Kundu ................ G06V 20/588 |
| 2020/0035102 A1* | 1/2020 | Satomura ............. G06V 20/582 |
| 2021/0180960 A1* | 6/2021 | Verstandig ............ G06N 3/045 |

* cited by examiner

NAVIGATION SYSTEM WITH MONO-CAMERA BASED TRAFFIC SIGN TRACKING AND POSITIONING MECHANISM AND METHOD OF OPERATION THEREOF

TECHNICAL FIELD

An embodiment of the present invention relates generally to a navigation system, and more particularly to a system for mono-camera based traffic sign tracking and positioning mechanism.

BACKGROUND

As users become more empowered with the growth of navigation devices and vehicle based navigation services, new and old paradigms begin to take advantage of this new device space. There are many technological solutions to take advantage of this new device capability to enhance or augment navigation and to improve vehicle safety. However, users are often not provided with the ability to determine the position of traffic signs during navigation or route guidance. Research and development in the existing technologies can take a myriad of different directions.

Thus, a need still remains for a navigation system with a mono-camera based traffic sign tracking and position mechanism for operator awareness while using a navigation system and route guidance. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a navigation system including: receiving multiple frames, including a first frame and a second frame, of images; detecting a traffic sign from the images between the first frame and the second frame based on a sign recognition model; extracting a first image from the first frame and a second image for the second frame; matching the traffic sign is the same in the first image and the second image based on a similarity model; generating a sign location of the traffic sign with an inertial measurement unit reading based on the first image and the second image; and generating a global coordinate for the sign location for displaying on a navigation map.

An embodiment of the present invention provides a navigation system, including: a communication unit configured to receive multiple frames, including a first frame and a second frame, of images; and a control unit, coupled to the communication unit, configured to: detect a traffic sign from the images between the first frame and the second frame based on a sign recognition model; extract a first image from the first frame and a second image for the second frame; match the traffic sign is the same in the first image and the second image based on a similarity model; generate a sign location of the traffic sign with an inertial measurement unit reading based on the first image and the second image; and generate a global coordinate for the sign location for displaying on a navigation map.

An embodiment of the present invention provides a non-transitory computer readable medium including instructions executable by a control circuit for a navigation system, the instructions including: receiving multiple frames, including a first frame and a second frame, of images; detecting a traffic sign from the images between the first frame and the second frame based on a sign recognition model; extracting a first image from the first frame and a second image for the second frame; matching the traffic sign is the same in the first image and the second image based on a similarity model; generating a sign location of the traffic sign with an inertial measurement unit reading based on the first image and the second image; and generating a global coordinate for the sign location for displaying on a navigation map.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
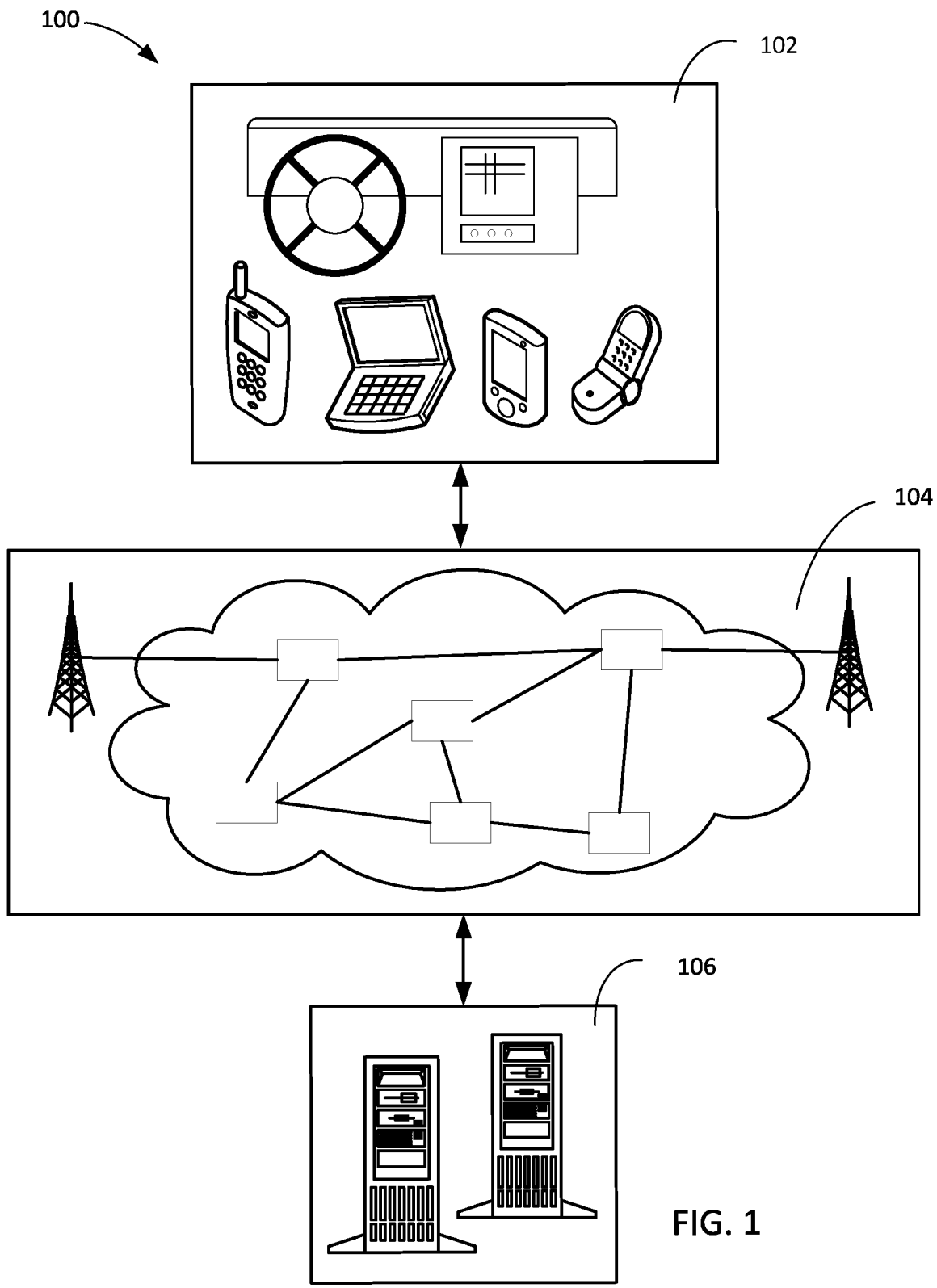
FIG. 1 is a navigation system with a mono-camera based traffic sign tracking and positioning mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Referring now to FIG. 1, therein is shown a navigation system 100 with a mono-camera based traffic sign tracking and position mechanism in an embodiment of the present invention. The navigation system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of computing devices, such as a cellular phone, a tablet computer, a smart phone, a notebook computer, vehicle embedded navigation system, or computing device. The first device 102 can couple, either directly or indirectly, to the communication path 104 to communicate with the second device 106 or can be a stand-alone device.

The second device 106 can be any of a variety of centralized or decentralized computing devices, sensor devices to take measurements or record environmental information, such as sensor instruments, sensor equipment, or a sensor array. For example, the second device 106 can be a multimedia computer, a laptop computer, a desktop computer, grid-computing resources, a virtualized computer resource, cloud computing resource, routers, switches, peer-to-peer distributed computing devices, or a combination thereof.

The second device 106 can be mounted externally or internally to a vehicle, centralized in a single room or within a vehicle, distributed across different rooms, distributed across different geographical locations, embedded within a telecommunications network. The second device 106 can couple with the communication path 104 to communicate with the first device 102.

For illustrative purposes, the navigation system 100 is described with the second device 106 as a computing device, although it is understood that the second device 106 can be different types of devices, such as a standalone sensor or measurement device. Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
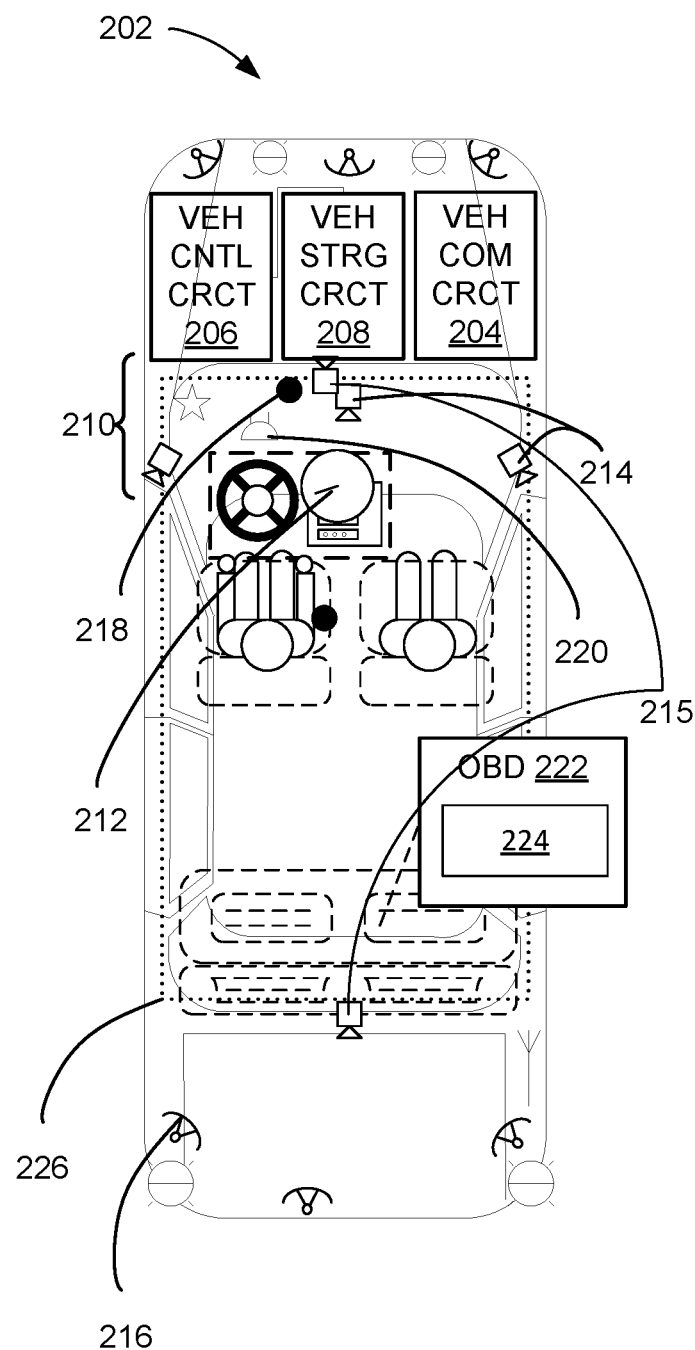
FIG. 2 is an example of a top plan view illustration of a vehicle for the navigation system.

Referring now to FIG. 2, therein is shown an example a top plan view of a vehicle 202 for the navigation system 100 of FIG. 1. As an example, the navigation system 100 can include or interact with the first device 102 of FIG. 1 as the vehicle 202. The vehicle 202 can also include one or more of environmental sensors 210. The vehicle 202 is an object or a machine used for transporting people or goods. The vehicle 202 can also be capable of providing assistance in maneuvering or operating the object or the machine.

The vehicle 202 can include or represent different types of vehicles. For example, the vehicle 202 can be an electric vehicle, a combustion vehicle, or a hybrid vehicle. Also for example, the vehicle 202 can be an autonomous vehicle or non-autonomous vehicle. As a specific example, the vehicle 202 can include a car, a truck, a cart, or a combination thereof.

The vehicle 202 can include a device, a circuit, one or more specific sensors, or a combination thereof for providing assistance or additional information to control, maneuver, or operate the vehicle 202. The vehicle 202 can include a vehicle communication circuit 204, a vehicle control circuit 206, a vehicle storage circuit 208, other interfaces, or a combination thereof.

The vehicle storage circuit 208 can include a functional unit or circuit integral to the vehicle 202 and configured to store and recall information. The vehicle storage circuit 208 can be a volatile memory, a nonvolatile memory, an internal memory, an external memory, or a combination thereof. For example, the vehicle storage circuit 208 can be a non-volatile storage such as non-volatile random access memory (NVRAM), Flash memory, disk storage, or a volatile storage such as static random access memory (SRAM). The vehicle storage circuit 208 can store vehicle software, other relevant data, such as input information, information from sensors, processing results, information predetermined or preloaded by the compute system 100 or vehicle manufacturer, or a combination thereof.

The vehicle control circuit 206 can include a function unit or circuit integral to the vehicle 202 and configured to execute or implement instructions. The vehicle control circuit 206 can execute or implement the vehicle software to provide the intelligence of the vehicle 202, the navigation system 100, or a combination thereof. The request can be from other parts of the vehicle 202, the navigation system 100, or a combination thereof or external to the navigation system 100.

The vehicle control circuit 206 can be implemented in a number of different manners. For example, the vehicle control circuit 206 can be a processor, an application specific integrated circuit (ASIC) an embedded processor, a microprocessor, a hardware control logic, a hardware finite state machine (FSM), a digital signal processor (DSP), or a combination thereof. As a more specific example, the vehicle control circuit 206 can include an engine control unit, one or more central processing unit, or a combination thereof.

The vehicle communication circuit 204 can include a function unit or circuit integral to the vehicle 202 and configured to enable external communication to and from the vehicle 202. For example, the vehicle communication circuit 204 can permit the vehicle 202 to communicate with the first device 102, the second device 106 of FIG. 1, the communication path 104 of FIG. 1, or a combination thereof. The vehicle communication circuit 204 can provide to other portions of the vehicle 202, the navigation system 100, or a combination thereof or external to the navigation system 100.

The vehicle communication circuit 204 can also function as a communication hub allowing the vehicle 202 to function as part of the communication path 104 and not limited to be an end point or terminal circuit to the communication path 104. The vehicle communication circuit 204 can include active and passive components, such as microelectronics or an antenna, for interaction with the communication path 104. For example, the vehicle communication circuit 204 can include a modem, a transmitter, a receiver, a port, a connector, or a combination thereof for wired communication, wireless communication, or a combination thereof.

The vehicle communication circuit 204 can couple with the communication path 104 to send or receive information directly between the vehicle communication circuit 204 and the first device 102, the second device 106, or a combination thereof as endpoints of the communication, such as for direct line-of-sight communication or peer-to-peer communication. The vehicle communication circuit 204 can further couple with the communication path 104 to send or receive information through a server or another intermediate device in between endpoints of the communication.

The vehicle 202 can further include various interfaces. The vehicle 202 can include one or more interfaces for interaction or internal communication between functional units or circuits of the vehicle 202. For example, the vehicle 202 can include one or more interfaces, such as drivers, firmware, wire connections or buses, protocols, or a combination thereof, for the vehicle storage circuit 208, the vehicle control circuit 206, or a combination thereof.

The vehicle 202 can further include one or more interfaces for interaction with an occupant, an operator or a driver, a passenger, or a combination thereof relative to the vehicle 202. For example, the vehicle 202 can include a user interface including input or output devices or circuits, such as a screen or touch screen, a speaker, a microphone, a keyboard or other input devices, an instrument panel, or a combination thereof.

The vehicle 202 can further include one or more interfaces along with switches or actuators for physically controlling movable components of the vehicle 202. For example, the vehicle 202 can include the one or more interfaces along with the controlling mechanisms to physically perform and control the maneuvering of the vehicle 202, such as for automatic driving or maneuvering features.

The functional units or circuits in the vehicle 202 can work individually and independently of the other functional units or circuits. The vehicle 202 can work individually and independently from the first device 102, the communication path 104, the second device 106, other devices or vehicles, or a combination thereof.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

The environmental sensors 210 are each a device for detecting or identifying environment of the vehicle 202. The environmental sensors 210 can detect, identify, determine, or a combination thereof for the vehicle 202 itself, such as for status or movement thereof. The environmental sensors 210 can detect, identify, determine, or a combination thereof for environment within a cabin of the vehicle 202, an environment external to and surrounding the vehicle 202, or a combination thereof.

For example, the environmental sensors 210 can include a location-movement sensor 212, a visual sensor 214, a radar sensor 216, an accessory sensor 218, a volume sensor 220, or a combination thereof. The location-movement sensor 212 can identify or calculate a geographic location of the vehicle 202, determine a movement of the vehicle 202, or a combination thereof. Examples of the location-movement sensor 212 can include an accelerometer, a speedometer, a GPS receiver or device, a gyroscope or a compass, or a combination thereof. The vehicle 202 can include the environmental sensors 210 other than or in addition to the location-movement sensor 212, such as thermal sensor. The thermal sensor can capture and provide temperature readings for portions of the vehicle 202. The thermal sensor can also capture and provide temperature readings external to the vehicle 202.

The visual sensor 214 can include a sensor for detecting or determining visual information representing the environment external to and surrounding the vehicle 202. The visual sensor 214 can include a camera attached to or integral with the vehicle 202. For example, the visual sensor 214 can include a camera, such as forward facing camera, a rear-view or back-up camera, a side-view or a blind-spot camera, or a combination thereof. Also for example, the visual sensor 214 can include an infrared sensor or a night vision sensor. As a specific example, the visual sensor 214 can include a mono-camera 215. The mono-camera 215 detects or determines visual information utilizing a single vision system. The mono-camera 215 does not require a dual vision or stereo vision system.

The visual sensor 214 can further include a camera on the first device 102 connected to and interacting with the vehicle 202. The visual sensor 214 can further include a cabin camera for detecting or determining visual information inside the vehicle or cabin of the vehicle.

The radar sensor 216 can include an object-detection system, device, or circuit. The radar sensor 216 can determine or identify an existence of an object or a target, such as an obstacle or another vehicle, external to the vehicle 202 a relative location or a distance between the object or the target and the vehicle 202, or a combination thereof.

The radar sensor 216 can utilize radio waves to determine or identify an existence of the object or the target, the relative location or a distance from the vehicle 202, or a combination thereof. For example, the radar sensor 216 can include a proximity sensor or warning system, such as for an area in front of, behind, adjacent to or on a side of, or a combination thereof geographically or physically relative to the vehicle 202.

The accessory sensor 218 can include a sensor for determining or detecting a status of a subsystem or a feature of the vehicle 202. The accessory sensor 218 can determine or detect the status or a setting for windshield wipers, turn signals, gear setting, headlights, or a combination thereof.

The volume sensor 220 can include a sensor for detecting or determining sounds for the vehicle 202. The volume sensor 220 can include a microphone for detecting or determining sounds within a cabin of the vehicle 202. The volume sensor 220 can further include a circuit for detecting or determining a volume level or an output level of speakers within the vehicle 202. The vehicle 202 can use one or more of the environmental sensors 210 describing or representing information regarding the environment within or surrounding the vehicle 202.

The vehicle 202 can also include on-board diagnostics 222 (OBD) that can be accessed by the vehicle control circuit 206. As an example, the vehicle control circuit 206 can access the on-board diagnostics 222 with the vehicle communication circuit 204. The vehicle 202 can store and retrieve the on-board diagnostics 222 to and from the vehicle storage circuit 208.

The on-board diagnostics 222 represent information about the vehicle 202. For example, the on-board diagnostics 222 can provide status or the state of the vehicle 202 or a portion thereof. As a specific example, the on-board diagnostics 222 can represent an ignition status 224.

The ignition status 224 represents the current state of the ignition. The ignition status 224 can represent whether the engine of the vehicle 202 is on or off. The term "on" refers to the state when the engine of the vehicle 202 is running. The term "off" refers to the state when the engine of the vehicle 202 is not running. The on-board diagnostics 222 can be carried over a vehicle bus 226 to communicate the ignition status 224.

As an example, the vehicle bus 226 can be a controller area network (CAN) of the vehicle 202 that allows interaction between the vehicle communication circuit 204, the vehicle control circuit 206, the vehicle storage circuit 208, the on-board diagnostics 222, other interfaces, or a combination thereof.

The vehicle 202 can further include a user device or a mobile device illustrated in FIG. 1. For example, the vehicle 202 can include the first device 102. As a more specific example, the vehicle communication circuit 204, the vehicle control circuit 206, the vehicle storage circuit 208, the environmental sensors 210, one or more interfaces, or a combination thereof can be included in or make up the first device 102 included in or integral with the vehicle 202. Also as a more specific example, the vehicle 202 can include or be integral with the first device 102 including an embedded computer system, an infotainment system, a smart driving or a driver assistance system, a self-driving or a maneuvering system for the vehicle, or a combination thereof.

Figure 3:
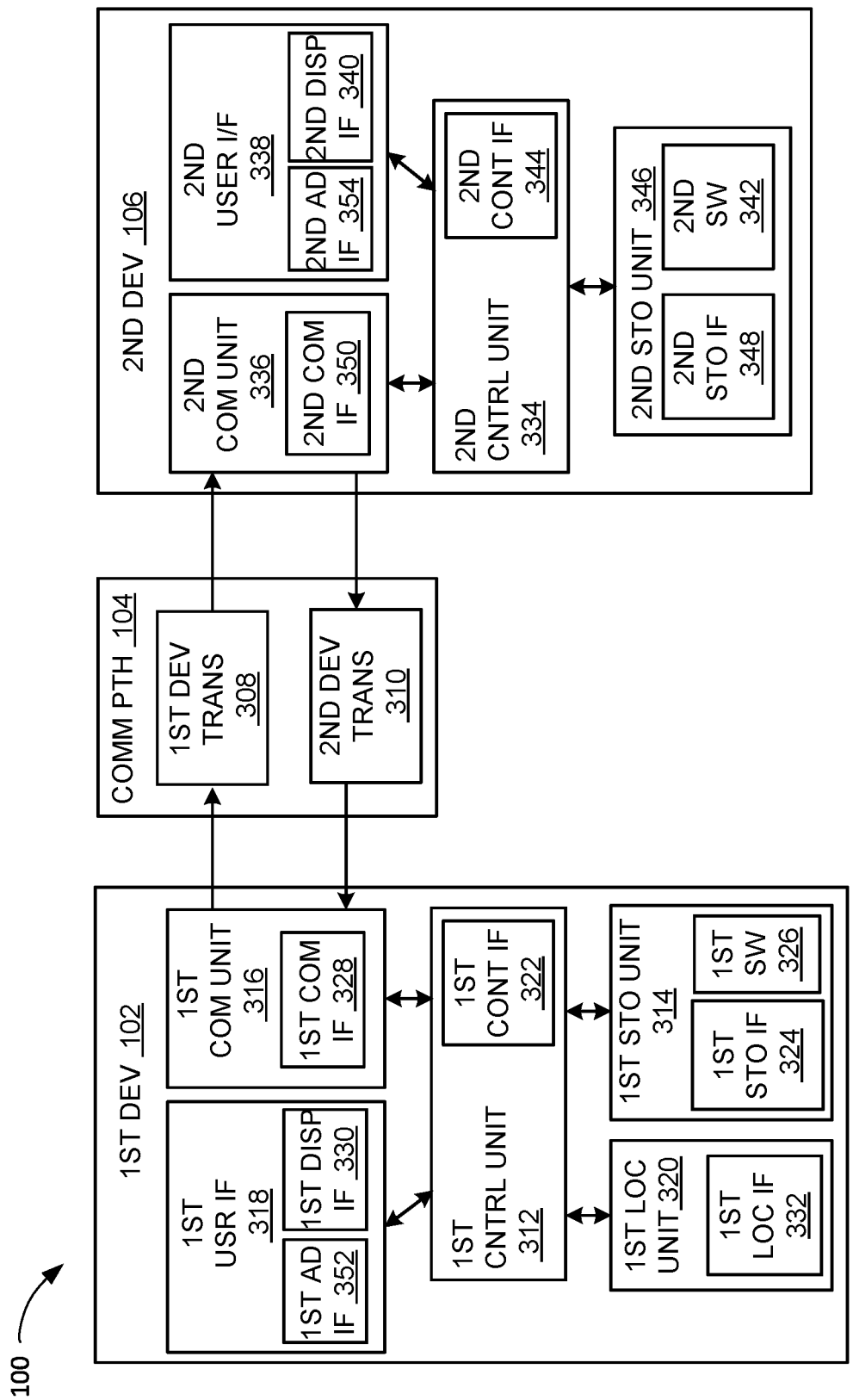
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, a first user interface 318, and a first location unit 320. The first control unit 312 can include a first control interface 322. The first control unit 312 can execute a first software 326 to provide the intelligence of the navigation system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. As a specific example, the first control unit 312 can represent the vehicle control circuit 206 of FIG. 2 of the vehicle 202 of FIG. 2. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first location unit 320 can generate location information, current heading, and current speed of the first device 102, as examples. The first location unit 320 can be implemented in many ways. For example, the first location unit 320 can function as at least a part of a global positioning system (GPS) such as a GPS receiver, an inertial navigation system, a cellular-tower location system, a pressure location system, or any combination thereof.

The first location unit 320 can include a first location interface 332. The first location interface 332 can be used for communication between the first location unit 320 and other functional units in the first device 102. The first location interface 332 can also be used for communication that is external to the first device 102.

The first location interface 332 can receive information from the other functional units or from external sources, or can transmit information to the other functional units or to external destinations. The external sources and the external destinations refer to sources and destinations physically separate from the first device 102.

The first location interface 332 can include different implementations depending on which functional units or external units are being interfaced with the first location unit 320. The first location interface 332 can be implemented with technologies and techniques similar to the implementation of the first control interface 322.

The first storage unit 314 can store the first software 326. The first storage unit 314 can also store the relevant information. For example, first storage unit 314 can store information such as a navigation map.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM). As a specific example, the first storage unit 314 can represent the vehicle storage circuit 208 of FIG. 2 of the vehicle 202.

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104. As a specific example, the first communication unit 316 can represent the vehicle communication circuit 204 of FIG. 2 of the vehicle 202.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs. Examples of the output device can include a first display interface 330 and a first audio interface 352.

The first display interface 330 can include a display, a projector, a video screen, a speaker, or any combination thereof. The first audio interface 352 can include sensors, speakers, microphones, headphones, subwoofers, surround sound components, transducers, or any combination thereof. The first display interface 330 and the first audio interface 352 allow a user of the navigation system 100 to interact with the navigation system 100.

The first control unit 312 can operate the first user interface 318 to display information generated by the navigation system 100. The first control unit 312 can also execute the first software 326 for the other functions of the navigation system 100. The first control unit 312 can further execute the first software 326 for interaction with the communication path 104 via the first communication unit 316.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340 and a second audio interface 354.

The second display interface 340 can include a display, a projector, a video screen, a speaker, or any combination thereof. The second audio interface 354 can include sensors, speakers, microphones, headphones, subwoofers, surround sound components, transducers, or any combination thereof. The second display interface 340 and the second audio interface 354 allow a user of the navigation system 100 to interact with the navigation system 100. The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the information for generating a map. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100.

Figure 4:
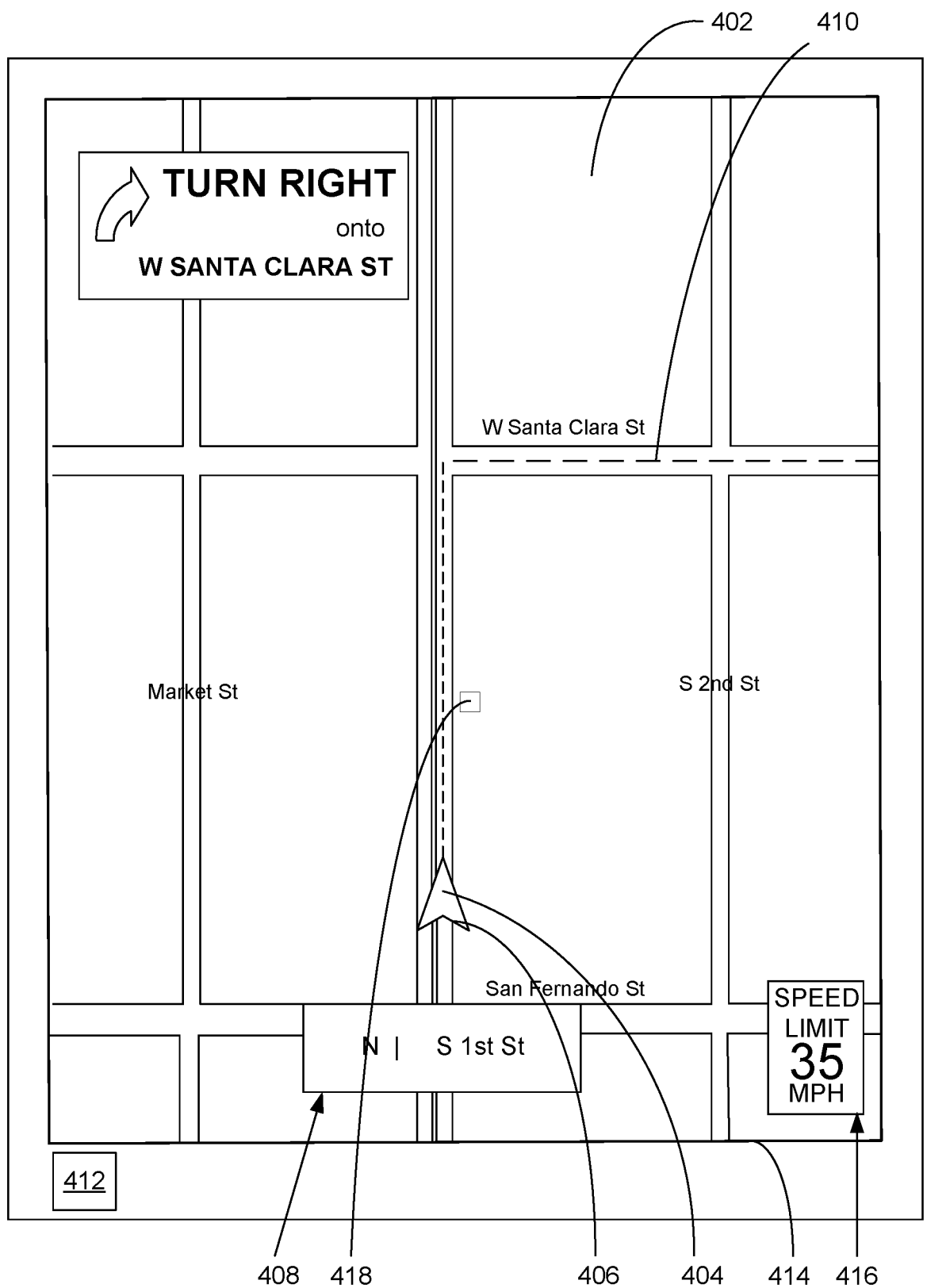
FIG. 4 is an example of a display interface of the navigation system.

Referring now to FIG. 4, therein is shown an example of a display interface of the navigation system 100 of FIG. 1. The display interface can show a navigation map 402. The navigation map 402 is a visual representation of a geographic area. For example, the navigation map 402 can be a representation of a state, a city, a town, a neighborhood, or any portion thereof. As a further example, the navigation map 402 can include the roadways in the geographic area. The navigation map 402 can be displayed by the first display interface 330 of FIG. 3, the second display interface 340 of FIG. 3, or a combination thereof. The navigation map 402 can be displayed in relation to a current location 404.

The current location 404 can represent the physical location of a device or vehicle. As examples, the current location 404 can be generated by the location-movement sensor 212 of FIG. 2, the first location unit 320 of FIG. 3, or a combination thereof. Also as examples, the current location 404 can provide a geographic location of the first device 102 of FIG. 1, the vehicle 202 of FIG. 2, or a combination thereof.

The current location 404 can be generated in a number of ways. For example, the current location 404 can be determined by a global positioning system (GPS), cellular triangulation, wireless fidelity (WiFi) triangulation, dead reckoning, or a combination thereof. The navigation system 100, the first device 102 of FIG. 1, the second device 106 of FIG. 1, the vehicle 202, or a combination thereof can track or provide the current location 404 dynamically and in real time.

The navigation system 100 tracking, providing, or receiving the current location 404 "dynamically" refers to the receiving, monitoring, or a combination thereof of the current location 404 that is non-static or by potentially differing mechanism. The navigation system 100 tracking the current location 404 "real time" refers to the receiving, monitoring, or a combination thereof of the current location 404 at the time of reading for the current location 404 is taken regardless of the mechanism at some time period from the source of the reading of the current location 404 to the destination to receive the current location 404 without buffering delay for the purpose of storage and not for transmission. The navigation system 100 can display the current location 404 on the first display interface 206, the second display interface 234, or a combination thereof.

The navigation system 100 can display the current location 404 in a directionality 406. The directionality 406 is the orientation towards movement. The directionality 406 can be determined by calculating the change in the current location 404 or based on dead reckoning, such as with an accelerometer or a gyroscope in the location-movement sensor 212, first location unit 320, or a combination thereof. For example, the directionality 406 can be determined based on the change in degrees of latitude, longitude, altitude, or a combination thereof, of the current location 404.

The navigation system 100 can also display a current roadway 408. The current roadway 408 is a road, path, a traversal route, or a portion thereof on which the vehicle 202, the first device 102, the second device 106, or a combination thereof is currently travelling. For example, the current roadway 408 can be a street, an alleyway, a highway, a freeway, a parkway, an expressway, a toll road, a residential road, or an unpaved path. The current roadway 408 can be determined based on the current location 404.

The navigation system 100 can display a travel route 410 for the vehicle 202, the first device 102, the second device 106, or a combination thereof to navigate. The travel route 410 is the path to navigate from the current location 404 to a route destination 412. For example, the travel route 410 can be determined based on the closest distance to the route destination 412, fastest time of arrival to the route destination 412, avoidance of tolls to the route destination 412, or other constraints.

The route destination 412 refers to a geographic location or point of interest. The route destination 412 can include the end point or the termination of the route or the guidance. The route destination 412 can also include waypoints or intermediate stops. For example, the route destination 412 can be a store, a landmark, an office building or site, a park, an address, a general geographic area, a street, a city or municipality, or a combination thereof. Also for example, a waypoint for the route can represent the route destination 412 when the guidance is terminated at that particular instances of the waypoint.

For brevity of description, in this embodiment as an example, reference to the first display interface 330 and the first user interface 318 of FIG. 3 is made, however, the descriptions with respect to the first display interface 330 and the first user interface 318 can be similarly applicable to the second display interface 340 and the second user interface 338 of FIG. 3.

In one embodiment, the first display interface 330, in conjunction with the first user interface 318, can enable a user of the navigation system 100 to input the route destination 412 to enable the navigation system 100 to generate the travel route 410. The user can input the route destination 412 by using alpha-numeric characters, symbols, voice commands, gestures, or a combination thereof. For example, the user can input the route destination 412 by interfacing with the first user interface 318, the second user interface 338, or a combination thereof. As a further example, the user can input the route destination 412 by interfacing with the first audio interface 352 of FIG. 3, the second audio interface 354 of FIG. 3, or a combination thereof.

The navigation system 100 can process or utilize the current location 404 to obtain map information 414. The map information 414 refers to a diagram or a collection of data representing an arrangement or distribution of geographic features, physical features, non-physical features, or a combination thereof of the geographic location on the navigation map 402. For example, the map information 414 can include a physical feature such as a path, street name, an infrastructure, a geographical feature, a natural topology, points of interest, building, bodies of water, or a combination thereof. As a further example, the map information 414 can also include a non-physical feature such as a speed limit, a one-way designation, an address, points of interest (POI) or a combination thereof. As a specific example, the map information 414 can include a traffic sign 416.

The traffic sign 416 provides instructions or information along the roadway. For example, the traffic sign 416 can include various types of signs controlling the flow of traffic, such as stop signs, yield signs, speed signs, one-way signs, no U-turn signs or a combination thereof. As further examples, the traffic sign 416 can include various types of signs providing information associated with the roadway, such as school zone signs, warning signs, pedestrian signs, or a combination thereof.

The navigation map 402 can display a sign location 418 of the traffic sign 416. The sign location 418 is the geographic location of the traffic sign 416 in relation to the current roadway 408. The sign location 418 can be displayed on the first display interface 330, the second display interface 340, or a combination thereof. For example, the sign location 418 can be on the left-hand side of the current roadway 408, the right-hand side of the current roadway 408, above the current roadway 408, or a combination thereof. Also for example, the sign location 418 can be ahead or behind the current location 404 on the current roadway 408.

Figure 5:
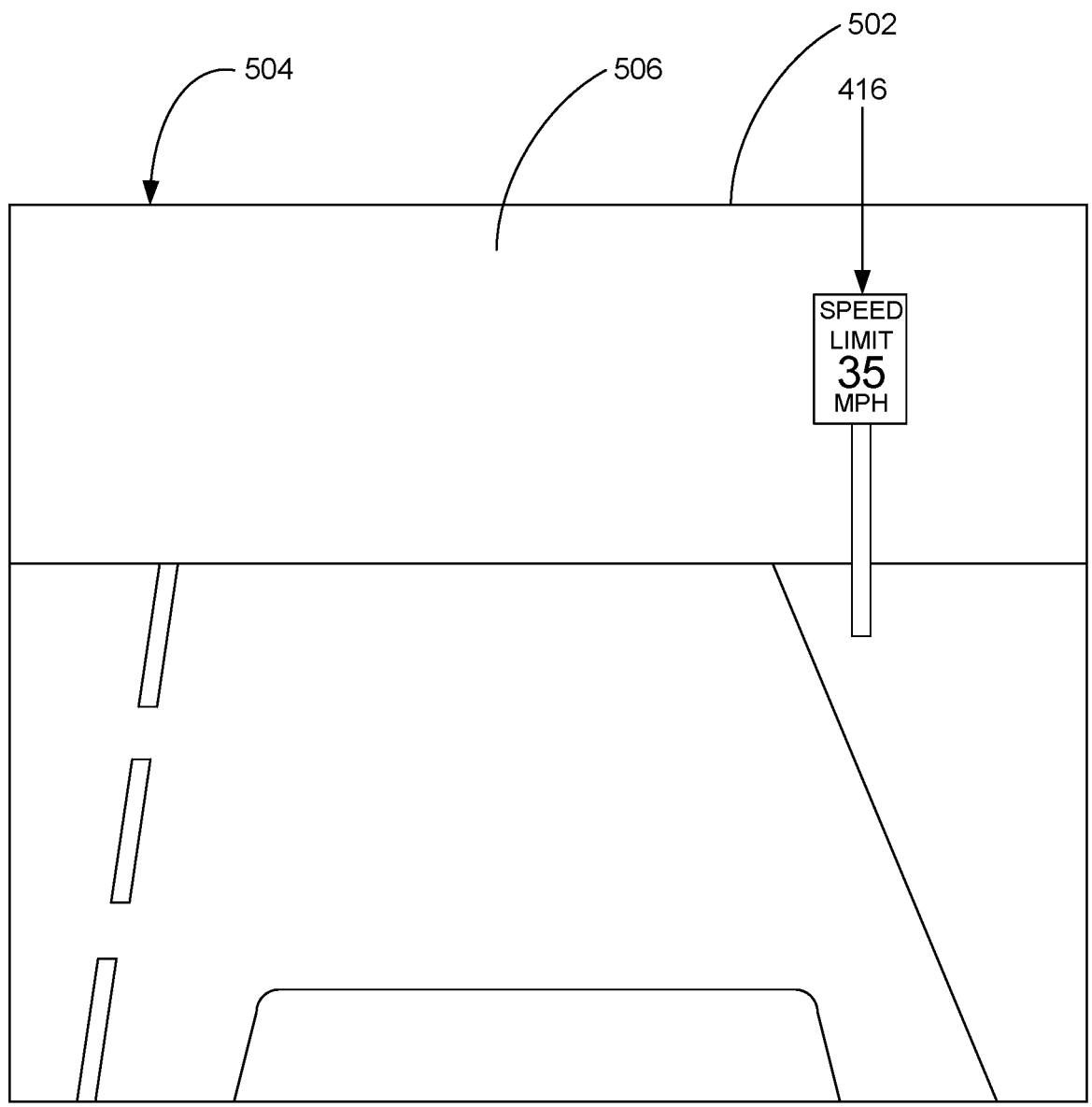
FIG. 5 is an example of a first frame with a first image.

Referring now to FIG. 5, therein is shown an example of a first frame 502 with a first image 504. The first frame 502 is an instance of a picture or segment of a video 506 captured by the mono-camera 215 of FIG. 2, the first device 102 of FIG. 1, the second device 106 of FIG. 1, or a combination thereof. The first frame 502 provides a visual representation of the view that is captured at a specific time by the mono-camera 215, the first device 102, the second device 106, or a combination thereof.

The video 506 includes multiple frames that are captured over a period of time. As an example, the video 506 can include the first frame 502. The video 506 provides a moving visual representation of the view of the mono-camera 215, the first device 102, the second device 106, or a combination thereof. For example, the video 506 can consist of 30 instances of the frames per second. As a further example, the video 506 can consist of 60 instances of the frames per second. The video 506 can be displayed utilizing the first display interface 330 of FIG. 3, the second display interface 340 of FIG. 3, or a combination thereof.

Returning to the example, the first image 504 is an instance of an image generated for an object or area within in the first frame 502. The first image 504 is the visual presentation of the view captured in the first frame 502. For example, the first image 504 can be of pedestrians, cyclists, passenger cars, trucks, motorcycles, bicycles, roadways, building, or a combination thereof in the first frame 502. As a specific example, the first image 504 can be of the traffic sign 416 in the first frame 502. The first image 504 can be generated or extracted by the vehicle control circuit 206 of FIG. 2, the first control unit 312 of FIG. 3, the second control unit 334 of FIG. 3, or a combination thereof.

Figure 6:
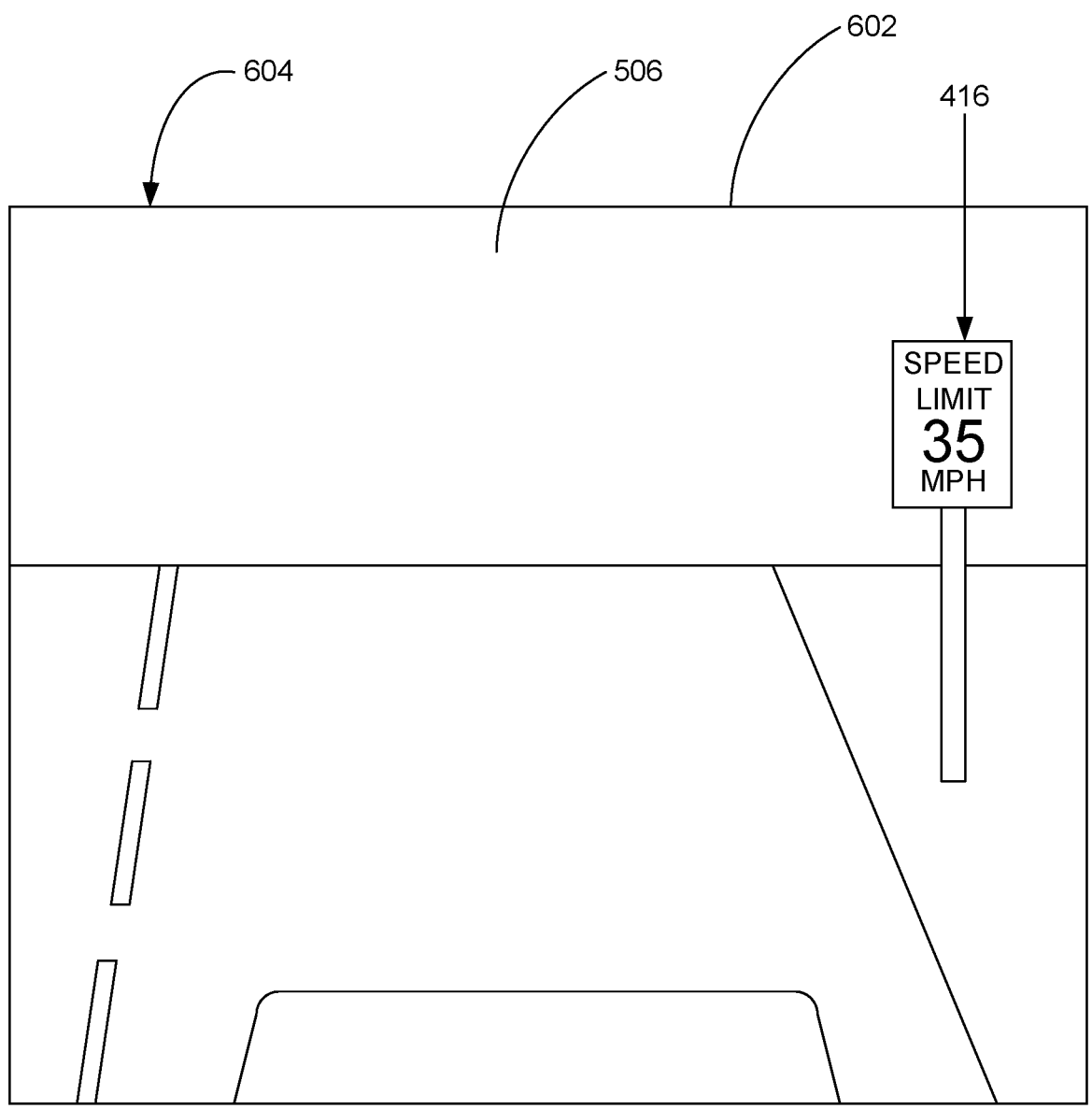
FIG. 6 is an example of a second frame with a second image.

Referring now to FIG. 6, therein is shown an example of a second frame 602 with a second image 604. The second frame 602 is an instance of the frame in the video 506 captured by the mono-camera 215 of FIG. 2, the first device 102 of FIG. 3, the second device 106 of FIG. 4, or a combination thereof. The second frame 602 provides a visual representation of the view that is captured at a specific time by the mono-camera 215, the first device 102, the second device 106, or a combination thereof. The second frame 602 can be an instance of the frame that was captured after or at a time after the first frame 502 of FIG. 5 in the video 506. For example, the second frame 602 can be the frame that follows milliseconds after the first frame 502 in the video 506. As a further example, the second frame 602 can be the frame that follows seconds after the first frame 502 in the video 506.

The second frame 602 can include the second image 604. The second image 604 is an instance of the image generated for an object or area within the second frame 602. For example, the second image 604 can be of pedestrians, cyclists, passenger cars, trucks, motorcycles, bicycles, or a combination thereof in the second frame 602. As a specific example, the second image 604 can be of the traffic sign 416 in the second frame 602. The second image 604 can be generated or extracted by the vehicle control circuit 206 of FIG. 2, the first control unit 312 of FIG. 3, the second control unit 334 of FIG. 3, or a combination thereof.

Figure 7:
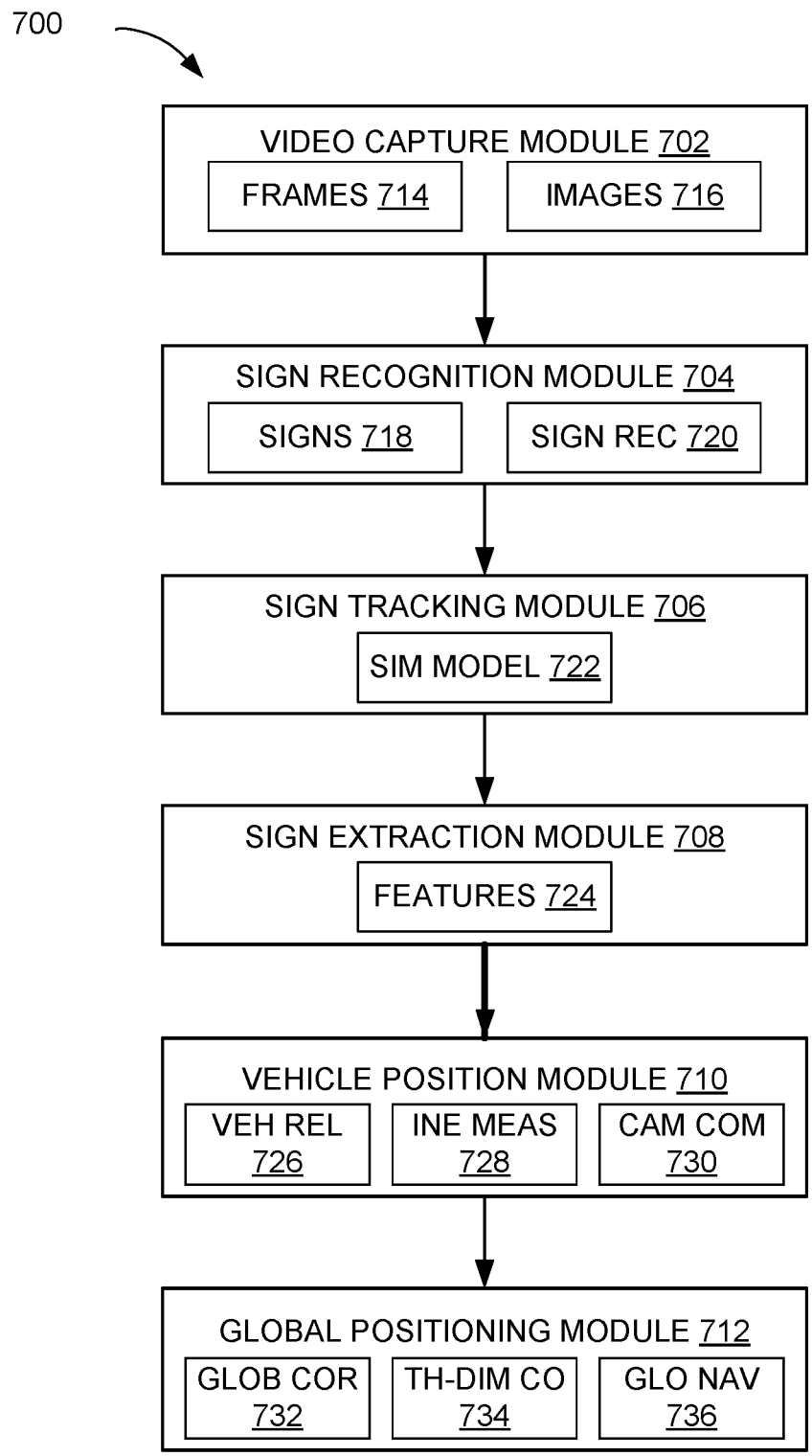
FIG. 7 is an exemplary control flow of the navigation system.

Referring now to FIG. 7, therein is shown an exemplary control flow 700 of the navigation system 100. The control flow 700 can be for tracking and locating the traffic sign 416 of FIG. 4 with the navigation system 100. The navigation system 100 can include a video capture module 702, a sign recognition module 704, a sign tracking module 706, a sign extraction module 708, a vehicle positioning module 710, a global positioning module 712, or a combination thereof.

The video capture module 702 can be coupled to the sign recognition module 704. The sign recognition module 704 can be coupled to the sign tracking module 706. The sign tracking module 706 can be coupled to the sign extraction module 708. The sign extraction module 708 can be coupled to the vehicle positioning module 710. The vehicle positioning module 710 can be coupled to the global positioning module 712.

The modules can be coupled using wired or wireless connections, by including an output of one module as an input of the other module, by including operations of one module influence operation of the other module, or a combination thereof. The modules can be directly coupled with no intervening structures or objects other than the connector there-between, or indirectly coupled.

The video capture module 702 is configured to capture the video 506 of FIG. 5 from the mono-camera 215 of FIG. 2, the first device 102 of FIG. 1, the second device 106 of FIG. 1, or a combination thereof. The video capture module 702 can capture the video 506 based on the ignition status 224 of FIG. 2 of the vehicle 202. The video capture module 702 can automatically capture the video 506 when the ignition status 224 is in the on position. The term "automatically" refers to when the mono-camera 215, the first device 102, the second device 106, or a combination thereof captures the video 215 without a manual action for the specific purpose to capture the video 215.

The video 506 can include frames 714 with images 716. The frames 714 can include the first frame 502 of FIG. 5, the second frame 602 of FIG. 6, or a combination thereof. The usage of the terms "first" and "second" for the first frame 502 and the second frame 602 are a matter of convenience and are not to limit an order or importance. As an example, the first frame 502 and the second frame 602 can be swapped in the order when one was captured relative to the other. In other words, after the second frame 602 is captured, a subsequent frame can be captured and that subsequent frame can be termed as the first frame 502.

The images 716 can include the first image 504 of FIG. 5, the second image 604 of FIG. 6, or a combination thereof. As with the first frame 502 and the second frame 602, the usage of the terms "first" and "second" for the first image 504 and the second image 604 are a matter of convenience and are not to limit an order or importance. As an example, the first image 504 and the second image 604 can be swapped in the order when the first frame 502 and the second frame 602 are swapped in the order when one was captured relative to the other. In other words, after the second image 604 is captured in the second frame 602, a subsequent image can be captured and that subsequent image can be termed as the first image 504 when the subsequent frame is termed as the first frame 502.

The video capture module 702 can capture the video 506, the frames 714, the first frame 502, the second frame 602, the images 716, the first image 504, the second image 604, or a combination thereof with the vehicle control circuit 206 of FIG. 2, the first control unit 312 of FIG. 3, the second control unit 334 of FIG. 3, or a combination thereof. The video capture module 702 can store the video 506, the frames 714, the first frame 502, the second frame 602, the images 716, the first image 504, the second image 604, or a combination thereof in the vehicle storage circuit 208 of FIG. 2, the first storage unit 314 of FIG. 3, the second storage unit 346 of FIG. 3, or a combination thereof. The video capture module 702 can transmit the video 506, the frames 714, the first frame 502, the second frame 602, the images 716, the first image 504, the second image 604, or a combination thereof with the vehicle communication circuit 204 of FIG. 2, the first communication unit 316 of FIG. 3, the second communication unit 336 of FIG. 3, or a combination thereof.

The control flow can pass from the video capture module 702 to the sign recognition module 704. For example, the control flow can pass a processing result as an output from the video capture module 702 to an input of the sign recognition module 704.

The sign recognition module 704 is configured to detect signs 718 in the video 506, the frames 714, the first frame 502, the second frame 602, or a combination thereof. The signs 718 can be any physical displays that provide information, including the traffic sign 416 of FIG. 4. The sign recognition module 704 can detect the signs 718, the traffic sign 416, or a combination thereof in the first frame 502, the second frame 602, or a combination thereof utilizing a sign detection model 720.

The sign detection model 720 can be an artificial intelligence or machine learning implementation that can be trained to learn, determine, or detect the signs 718 from the video 506. For example, the sign detection model 720 can be trained to learn to detect various instances of the signs 718, including the types of the traffic sign 416, from the video 506, the frames 714, images 716 in the frames 714, or a combination thereof.

The sign detection model 720 can be trained utilizing information, from a database or other input with pictures of various instances of the signs 718. For example, the sign detection model 720 can also detect the traffic sign 414 as one of the signs 718. Also as examples, the information or pictures of the signs 718 can represent the traffic sign 414 at numerous angles, partial views, lighting, colors, types of signs, clarity, in various weather conditions, or a combination thereof. The sign detection model 720 can be trained and learn to detect various instances of the signs 718 even if the traffic sign 414 is not an exact example as the information or pictures used for training.

The sign detection model 720 can be implemented in a number of ways. For example, the sign detection model 720 can be implement with neural networks, such as convolution neural network, full connected network, or a combination thereof. Also for example, the sign detection model 720 can include unsupervised learning and other forms of supervised learning. The sign detection model 720 can work with artificial intelligence or machine learning that provides global minimum, one or more local minima, or a combination thereof.

Continuing with the example, the sign detection model 720 can detect various instances of the signs 718 from the video 506, the frames 714, the images 716 in the frames 714, or a combination thereof. For example, the sign detection model 720 can also detect the traffic sign 414 as one of the signs 718. As a specific example, the sign detection model 720 can detect the signs 718 in the first frame 502, the second frame 602, or a combination thereof. Also as a specific example, the sign detection model 720 can detect a stop sign as the traffic sign 414 in the first frame 502, the second frame 602, or a combination thereof. As a further example, the sign detection model 720 can detect a speed sign as the traffic sign 414 in the first frame 502, the second frame 602, or a combination thereof.

Continuing with the example, the sign detection model 720 can detect a number of the signs 718. As a specific example, one of the signs 718 can include the traffic sign 414. The sign detection model 720 can determine the instances of the traffic sign 414 from the number of the signs 718.

The sign recognition module 704, the sign detection model 720, or a combination thereof can detect the signs 718, the traffic sign 414, or a combination thereof with the vehicle control circuit 206, the first control unit 312, the second control unit 334, or a combination thereof. The sign recognition module 704 can transmit the signs 718, the traffic sign 414, or a combination thereof with the vehicle communication circuit 204, the first communication unit 316, the second communication unit 336, or a combination thereof. The flow can progress to the sign tracking module 706 to process the images 716 containing the signs 718, the traffic sign 414, or a combination thereof detected by the sign detection model 720.

The sign tracking module 706 can utilize the traffic sign 414 detected by the sign recognition module 704 to track each instance of the traffic sign 414 in the video 506, the frames 714, the images 716 in the frames 714, or a combination thereof. Each instance of the traffic sign 414 can be included in a portion of the video 506, the frames 714, the images 716 of the frames 714, or a combination thereof with no requirement to exist or be detected in the entirety of the video 506 or all of the frames 714.

For example, the sign tracking module 706 can analyze the first frame 502, the second frame 602, or a combination thereof including each of the instances of the traffic sign 414 from the video 506. The sign tracking module 706 can also analyze multiple instances of the first frame 502, the second frame 602, or a combination thereof. The sign tracking module 706 can capture the images 716 containing an instance of the traffic sign 414 from the first frame 502, the second frame 602, or a combination thereof.

The first frame 502 and the second frame 602 can be adjacent to each other and consecutive order of the frames 714 in the video 506. The first frame 502 and the second frame 602 can also be nonadjacent to each other and not in consecutive order of the frames 714 in the video 506. The location of the first frame 502 and the second frame 602 relative to each other in the frames 714 or within the video 506 is not limited to how far apart one is relative to the other.

As an example, the sign tracking module 706 detects each instance of the traffic sign 414 throughout the video 506 and across the frames 714 regardless of the location of the frames 714 within the video 506. Also as an example, the sign tracking module 706 monitors and tracks each instance of the traffic sign 414 across the video 506, the frames 714, the images 716 of the frames 714, or a combination thereof. The sign tracking module 706 can detect each instance of the traffic sign 414 independently, collectively, as subsets, or a combination thereof across the video 506.

Continuing the example, the sign tracking module 706 can extract the images 716 of each of instance of the traffic sign 414 from the frames 714. For example, the sign tracking module 706 can extract the first image 504 of the traffic sign 414 from the first frame 502 and the second image 604 of the traffic sign 414 from the second frame 602. The sign tracking module 706 can track or match each instance of the traffic sign 414 in the first image 504, the second image 604, or a combination thereof utilizing a similarity model 722.

The similarity model 722 measures the degree of similarity between each of instance of the traffic sign 414 between the first image 504, the second image 604, or a combination thereof. The similarity model 722 can determine whether the instances of the traffic sign 414 in the first image 504, the second image 604, or a combination thereof represent the same instance of the traffic sign 414. For example, the similarity model 722 can utilize deep learning models to determine the degree of similarity.

The similarity model 722 can be implemented in a number of ways. For example, the similarity model 722 can be implement with neural networks, such as convolution neural network, full connected network, or a combination thereof. Also for example, the similarity model 722 can include unsupervised learning and other forms of supervised learning. The similarity model 722 can work with artificial intelligence or machine learning that provides global minimum, one or more local minima, or a combination thereof.

Similar to the sign detection model 720, the similarity model 722 can be an artificial intelligence or machine learning implementation that can be trained to learn, determine, or detect types of the traffic sign 414 from the video 506. For example, the similarity model 722 can be trained to learn to detect various instances of the traffic sign 414 from the video 506, the frames 714, images 716 in the frames 714, or a combination thereof. The similarity model 722 can be trained utilizing information, from a database or other input with pictures of various instances of the traffic sign 414. Also as examples, the information or pictures of the traffic sign 414 can represent the traffic sign 414 at numerous angles, partial views, lighting, colors, types of signs, clarity, in various weather conditions, or a combination thereof. The similarity model 722 can be trained and learn to detect the traffic sign 414 even if the traffic sign 414 is not an exact example as the information or pictures used for training.

Moreover, the similarity model 722 can be trained to learn to detect specific instances of the traffic sign 414 across the video 506, the frames 714, the images 716 of the frames 714, or a combination thereof. In other words, the similarity model 722 can be utilized to match each specific instance of the traffic sign 414 in each of the frames 714 as needed and beyond a general detection of any instance or type of the traffic sign 414.

The sign tracking module 706 can detect the traffic sign 414 in the first frame 502, the second frame 602, the first image 504, the second image 604, or a combination thereof with the vehicle control circuit 206, the first control unit 312, the second control unit 334, or a combination thereof. The sign tracking module 706 can obtain the images 716, the first image 504, the second image 604, or a combination thereof of the traffic sign 414 with the vehicle communication circuit 204, the first communication unit 316, the second communication unit 336, or a combination thereof. The sign tracking module 706 can determine that the traffic sign 414 in the first frame 502 and the second frame 602 are the same instance of the traffic sign 414 with the vehicle control circuit 206, the first control circuit 312, the second control circuit 334, or a combination thereof.

The control flow can pass to the sign extraction module 708 after tracking the traffic sign 414 in the video 506, the frames 714, the images 716 in the frames 714, or a combination thereof. For example, the control flow can pass a processing result as an output from the sign tracking module 706 to an input of the sign extraction module 708.

The sign extraction module 708 is configured to process each of the images 716 in the frames 714 including the first image 504, the second image 604, or a combination thereof. The sign extraction module 708 processes the first image 504, the second image 604, or a combination thereof by extracting features 724 representing or relating or associated with the signs 718, the traffic sign 414, or a combination thereof in the frames 714, the first frame 502, the second frame 602, or a combination thereof. For example, the sign extraction module 708 can process the frames 714, the first image 504, the second image 604, or a combination thereof utilizing the KAZE features. As a further example, the sign extraction module 708 can process the frames 714, the first image 504, the second image 604, or a combination thereof utilizing ORB features.

The features 724 are the attributes or characteristics of or associated with the signs 718 or the traffic sign 414 in the first image 504, the second image 604, or a combination thereof. For example, the features 724 can include the shape of the signs 718, the traffic sign 414, or a combination thereof. As a further example, the features 724 can include the wording, numbers, or a combination thereof of or associated with the signs 718, the traffic sign 414, or a combination thereof. Further for example, the features 724 can also include symbols, such as arrows, lines, outlines of animals, or a combination thereof.

The sign extraction module 708 can determine the features 724 associated with the signs 718, the traffic sign 414, or a combination thereof from the frames 714 and the images 716 in the frames 714. The sign extraction module 708 can determine the features 724 associated with the signs 718, the traffic sign 414, or a combination thereof based on information not directly from the frames 714 or the images 714 but from other information associated with the images 716.

As an example, the sign extraction module 708 can utilize geolocation tagged with the frames 714 to pull up map data for confirmation of existence or location of the signs 718, the traffic sign 414, or a combination thereof. As a further example, the sign extraction module 708 can determine the features 724 associated with the existence or location of the signs 718, the traffic sign 414, or a combination thereof, such as an intersection, railroad tracks, construction work along roadway, or a combination thereof. The sign extraction module 708 can determine the existence or location of the signs 718, the traffic sign 414, or a combination thereof from external sources, such as intersection or railroad crossing from map data that is often associated with the signs 718.

The sign extraction module 708 can determine the features 724 associated with the signs 718, the traffic sign 414, or a combination thereof between the frames 714 and the images 716 in the frames 714. For example, the sign extraction module 708 can determine the same instance of the features 724 for the traffic sign 414 in the first image 504 of the first frame 502, the second image 604 of the second frame 602, or a combination thereof. As a further example, the sign extraction 706 can determine the same instance of the features 724 for the sign 414 in the first image 504 of the first frame 502, the second image 604 of the second frame 602, or a combination thereof.

The sign extraction module 708 can process the first image 504, the second image 604, or a combination thereof with the vehicle control circuit 206, the first control unit 312, the second control unit 334, or a combination thereof. The sign extraction module 708 can communicate the features 724 of the traffic sign 414 with the vehicle communication circuit 204, the first communication unit 316, the second communication unit 336, or a combination thereof. The sign extraction module 708 can store the features 724 of the traffic sign 414 with the vehicle storage circuit 208, the first storage unit 314, the second storage unit 346, or a combination thereof.

The control flow can pass to the vehicle positioning module 710 when the sign extraction module 708 determines features 724 of the traffic sign 414 are found in the first image 504 and the second image 604. The vehicle positioning module 710 can utilize the traffic sign 414 found in the first image 504, the second image 604, or a combination thereof.

The vehicle position module 710 is configured to determine a vehicle relative position 726 based on the first frame 502, the second frame 602, or a combination thereof. The vehicle relative position 726 is the location of the vehicle 202 in relation to the traffic sign 414 in the first frame 502, the second frame 602, or a combination thereof. The vehicle position module 710 measures the movement of the vehicle 202 based on the features 724 of the traffic sign 414 in the first frame 502, the second frame 602, or a combination thereof. For example, the vehicle positioning module 710 can determine the vehicle relative position 726 based on an inertial measurement unit reading 728, a camera compensation 730, or a combination thereof.

The inertial measurement unit reading 728 is the measurement of the translation and rotation of the vehicle 202 between the first frame 502 and the second frame 602. The inertial measurement unit reading 728 can obtain the translation and rotation of the vehicle 202 from the location-movement sensor 212 of FIG. 2, the first location unit 320 of FIG. 3, or a combination thereof. For example, the inertial measurement unit reading 728 can provide the movement of the vehicle 202 based on the accelerometer, gyroscope, or a combination thereof. As a further example, the inertial measurement unit reading 728 can be synchronized with the mono-camera 215, the first device 102, the second device 106, or a combination thereof to obtain the translation and rotation of the vehicle 202 between the first frame 502, the second frame 602, or a combination thereof.

The camera compensation 730 is the adjustment calculated to determine the accurate distance and depth of objects captured in the images 716. The vehicle positioning module 710 generates the camera compensation 730 based on the parameters of the camera capturing the first frame 502, the second frame 602, or a combination thereof. For example, the camera compensation 730 is calculated for the mono-camera 215, the first device 102, the second device 106, or a combination thereof.

The camera compensation 730 can allow for the correct determination of the distance and depth of the traffic sign 414 based on the first image 504, the second image 604, or a combination thereof. As a specific example, the vehicle positioning module 710 can generate the camera compensation 730 for the mono-camera 215 to determine the correct distance and depth of the traffic sign 414 in the first image 504, the second image 604, or a combination thereof.

The vehicle positioning module 710 can calculate the vehicle relative position 726, the camera compensation 730, or a combination thereof with the vehicle control circuit 206, the first control unit 312, the second control unit 334, or a combination thereof. The vehicle positioning module 710 can obtain the inertial measurement unit reading 728 with the vehicle communication circuit 204, the first communication unit 316, the second communication unit 336, or a combination thereof. The vehicle positioning module 710 can store the vehicle relative position 726, the inertial measurement unit reading 728, the camera compensation 730, or a combination thereof with the vehicle storage circuit 208, the first storage circuit 314, the second storage circuit 346, or a combination thereof.

The control flow can pass to the global positioning module 712 after determining the vehicle relative position 726 based on the traffic sign 414 in the first frame 502, the second frame 602, or a combination thereof. For example, the control flow can pass a processing result as an output from the vehicle positioning module 710 to an input of the global positioning module 712.

The global positioning module 712 is configured to generate a global coordinate 732 of the traffic sign 414. The global coordinate 732 is the latitude and longitude coordinates on the navigation map 402. The global coordinate 732 of the traffic sign 414 can be determined based on a three-dimensional coordinate 734, a global navigation satellite system reading 736, or a combination thereof.

The three-dimensional coordinate 734 is the reconstruction of the traffic sign 414, the vehicle 202, or a combination thereof based on the vehicle relative position 726, the sign location 418, or a combination thereof. The three-dimensional coordinate 734 determines the distance between objects in three-dimensions. The three-dimensional coordinate 734 can be generated based on the vehicle relative position 726, the sign location 418, the features 724 of the traffic sign 414, or a combination thereof between the first frame 502 and the second frame 602. The three-dimensional coordinate 734 can calculate the distance of the traffic sign 414 by calculating the changes to the vehicle relative position 726, the sign location 418, the features 724 of the traffic sign 414, or a combination thereof between the first frame 502 and the second frame 602.

The global navigation satellite system reading 736 is a reading of the location-movement sensor 212, the first location unit 320, or a combination thereof. The global navigation satellite system reading 736 can provide the global coordinate 732 for the vehicle 202, the first device 102, the second device 106, or a combination thereof. The global navigation satellite system reading 736 can be obtained for the first frame 502, the second frame 602, or a combination thereof.

The global positioning module 712 calculates the global coordinate 732 of the traffic sign 414 utilizing the distance between the vehicle 202 and the traffic sign 414 calculated utilizing the three-dimensional coordinate 734 and the global navigation satellite system reading 736 of the first frame 502, the second frame 602, or a combination thereof. The global positioning module 712 can display the traffic sign 414 on the navigation map 402 utilizing the global coordinate 732 of the traffic sign 414.

The global positioning module 712 can calculate the three-dimensional coordinate 734, the global coordinate 732 of the traffic sign 414, or a combination thereof with the vehicle control circuit 206, the first control unit 312, the second control unit 334, or a combination thereof. The global positioning module 712 can communicate the three-dimensional coordinate 734, the global navigation satellite system reading 736, or a combination thereof with the vehicle communication circuit 204, the first communication unit 316, the second communication unit 336, or a combination thereof. The global positioning module 712 can display the global coordinate 732 of the traffic sign 414 on the navigation map 402 with the first display interface 330, the second display interface 340, or a combination thereof.

It has been discovered that the navigation system 100 provides improved operation safety of the vehicle 202 by displaying the traffic sign 414, the sign location 418, or a combination thereof on the navigation map 402 utilizing the global coordinates 732 of the traffic sign 414 to raise awareness to the user of the vehicle 202.

It has further been discovered that the navigation system 100 can track and position the traffic sign 414 utilizing a cost-effective mono-camera 215 mechanism by calculating the global coordinate 732 of the traffic sign 414 utilizing the three-dimensional coordinate 734, the global navigation satellite system reading 736, or a combination thereof.

It has further been discovered that the navigation system 100 can verify the global coordinate 732 of the traffic sign 414 on the navigation map 402 utilizing the three-dimensional coordinate 734, the global navigation satellite system reading 736, or a combination thereof based on the video 506, the frames 714, the images 716 of the frames 714, or a combination thereof. The navigation system 100 can further update the global coordinate 732 of the traffic sign 414 on the navigation map 402 based on the global coordinate 732 determined based on the three-dimensional coordinate 734, the global navigation satellite system reading 736, or a combination thereof.

The navigation system 100 has been described with module functions or order as an example. The navigation system 100 can partition the modules differently or order the modules differently. For example, the sign recognition module 704 can be coupled to the video capture module 702. As a further example, the sign extraction module 708 can be coupled to the sign recognition module 704.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be hardware implementation or hardware accelerators in the first control unit 312 or in the second control unit 334. The modules can also be hardware implementation or hardware accelerators within the first device 102 or the second device 106 but outside of the first control unit 312 or the second control unit 334, respectively, as depicted in FIG. 3. However, it is understood that the first control unit 312, the second control unit 334, or a combination thereof can collectively refer to all hardware accelerators for the modules.

The modules described in this application can be implemented as instructions stored on a non-transitory computer readable medium to be executed by a first control unit 312, the second control unit 334, or a combination thereof. The non-transitory computer medium can include the first storage unit 314, the second storage unit 346, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

The physical transformation from determining the global coordinate 732 of the traffic sign 414 results in the display of the traffic sign 414 in the physical world, such as display of the sign location 418 on the navigation map 402. Movement in the physical world, such movement of the traffic sign 414, results in changes to the sign location 418 by updating the navigation map 302.

Figure 8:
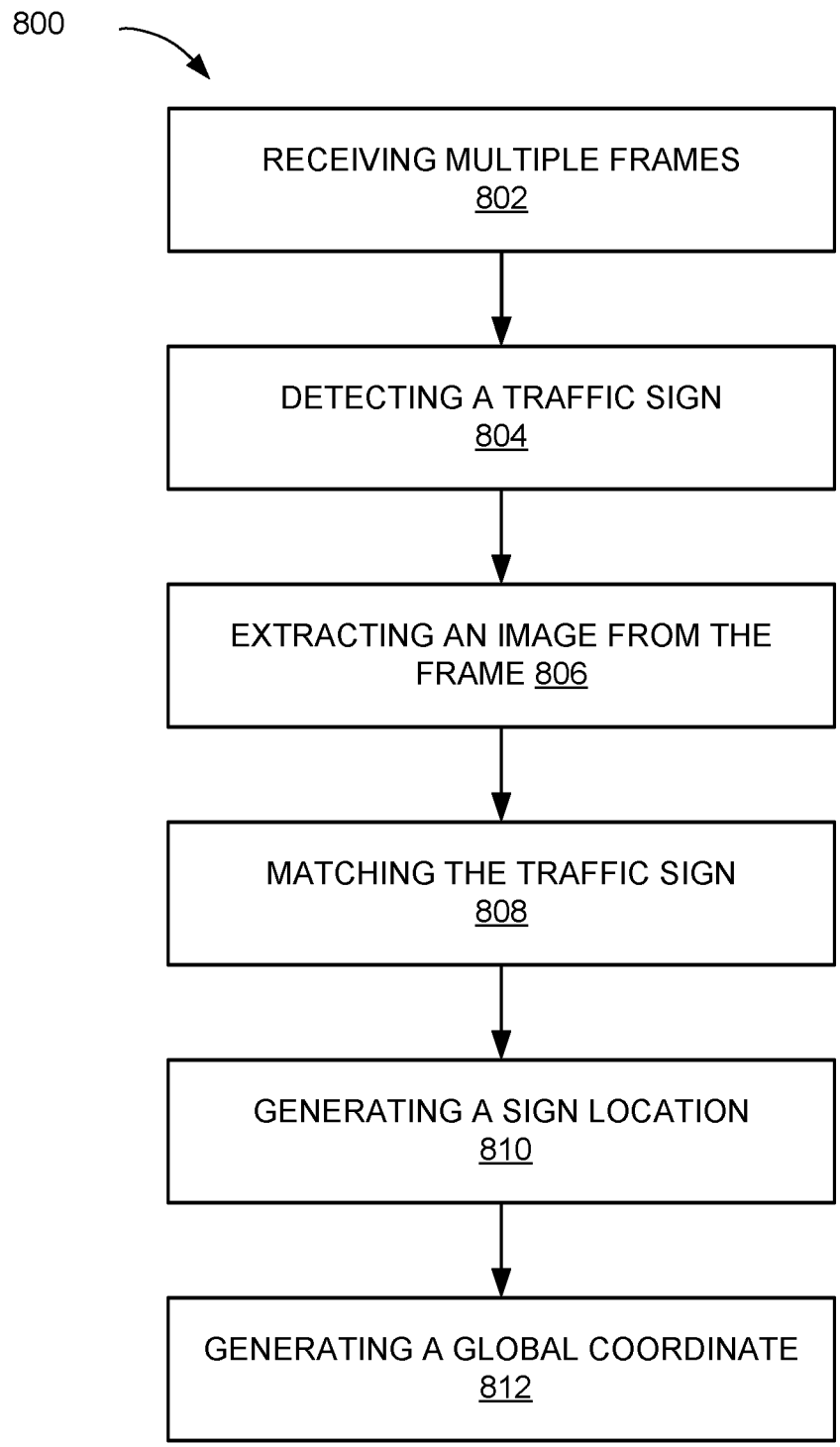
FIG. 8 is an exemplary flow chart of a method of operation of a navigation system in an embodiment of the present invention.

Referring now to FIG. 8, therein is shown a flow chart of a method 800 of operation of a navigation system 100 in an embodiment of the present invention. The method 800 includes: receiving multiple frames, including a first frame and a second frame, of images in a block 802; detecting a traffic sign from the images between the first frame and the second frame based on a sign recognition model in a block 804; extracting a first image from the first frame and a second image from the second frame in a block 806; matching the traffic sign is the same in the first image and the second image based on a similarity model in a block 808; generating a sign location of the traffic sign with an inertial measurement unit reading based on the first image and the second image in a block 810; and generating a global coordinate for the sign location for displaying on a navigation map in a block 812.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a navigation system comprising:
   receiving multiple frames, including a first frame and a second frame, of images;
   detecting a traffic sign from the images between the first frame and the second frame based on a sign recognition model;
   extracting a first image from the first frame and a second image from the second frame;
   matching the traffic sign is the same in the first image and the second image based on a similarity model;
   generating a sign location of the traffic sign with an inertial measurement unit reading based on the first image and the second image;
   generating a vehicle relative position associated with a mono-camera for receiving the multiple frames;
   generating a camera compensation for the mono-camera; and
   generating a global coordinate for the sign location, including triangulating the sign location based on a vehicle relative position, a camera compensation, and a matching, for displaying on a navigation map.

2. The method as claimed in claim 1 wherein generating the sign location include generating a three-dimensional coordinate with the inertial measurement unit reading.

3. The method as claimed in claim 1 wherein receiving multiple frames of images includes receiving a video from a mono-camera.

4. The method as claimed in claim 1 wherein generating the global coordinate for the sign location including generating the global coordinate based on the inertial measurement unit reading and a global navigation satellite system reading.

5. The method as claimed in claim 1 further comprising:
tracking the traffic sign from the images in the first frame and the second frame; and wherein:
extracting the first image and the second image includes extracting the traffic sign being tracked in the first image and the second image.

6. The method as claimed in claim 1 further comprising storing the global coordinate for the sign location with the navigation map.

7. A navigation system comprising:
a communication unit configured to receive multiple frames, including a first frame and a second frame, of images; and
a control unit, coupled to the communication unit, configured to:
detect a traffic sign from the images between the first frame and the second frame based on a sign recognition model;
extract a first image from the first frame and a second image from the second frame;
match the traffic sign is the same in the first image and the second image based on a similarity model;
generate a sign location of the traffic sign with an inertial measurement unit reading based on the first image and the second image;
generate a vehicle relative position associated with a mono-camera for receiving the multiple frames,
generate camera compensation for the mono-camera; and
generate a global coordinate for the sign location, including triangulating the sign location based on a vehicle relative position, a camera compensation, and a matching for displaying on a navigation map.

8. The system as claimed in claim 7 wherein the control unit is configured to generate a three-dimensional coordinate with the inertial measurement unit reading.

9. The system as claimed in claim 7 wherein the communication unit is configured to receive a video from a mono-camera.

10. The system as claimed in claim 7 wherein the control unit is configured to generate the global coordinate based on the inertial measurement unit reading and a global navigation satellite system reading.

11. The system as claimed in claim 7 wherein the control unit is configured to:
track the traffic sign from the images in the first frame and the second frame; and
extract the first image and the second image includes extracting the traffic sign being tracked in the first image and the second image.

12. The system as claimed in claim 7 wherein the control unit is configured to store the global coordinate for the sign location with the navigation map.

13. A non-transitory computer readable medium including instructions executable by a control circuit for a navigation system, the instructions comprising:
receiving multiple frames, including a first frame and a second frame, of images;
detecting a traffic sign from the images between the first frame and the second frame based on a sign recognition model;
extracting a first image from the first frame and a second image from the second frame;
matching the traffic sign is the same in the first image and the second image based on a similarity model;
generating a sign location of the traffic sign with an inertial measurement unit reading based on the first image and the second image;
generating a vehicle relative position associated with a mono-camera for receiving the multiple frames:
generating a camera compensation for the mono-camera; and
generating a global coordinate for the sign location, including triangulating the sign location based on a vehicle relative position, a camera compensation and a matching for displaying on a navigation map.

14. The non-transitory computer readable medium as claimed in claim 13, wherein the instructions include generating a three-dimensional coordinate with the inertial measurement unit reading.

15. The non-transitory computer readable medium as claimed in claim 13, wherein receiving multiple frames of images includes receiving a video from a mono-camera.

16. The non-transitory computer readable medium as claimed in claim 13, wherein the instructions include generating the global coordinate for the sign location including generating the global coordinate based on the inertial measurement unit reading and a global navigation satellite system reading.

17. The non-transitory computer readable medium as claimed in claim 13, wherein the instructions include:
tracking the traffic sign from the images in the first frame and the second frame; and
extracting the first image and the second image includes extracting the traffic sign being tracked in the first image and the second image.

\* \* \* \* \*

UNITED STATES PATENT AND TRADEMARK OFFICE
CERTIFICATE OF CORRECTION

PATENT NO. : 12,008,819 B2
APPLICATION NO. : 17/394112
DATED : June 11, 2024
INVENTOR(S) : Hui Fang, Congmin Bai and Lina Hu It is certified that error appears in the above-identified patent and that said Letters Patent is hereby corrected as shown below:

In the Claims

Column 25, Claim 7, Line 39, delete "," and insert therefor --;--

Column 25, Claim 7, Line 40, delete "generate camera" and insert therefor --generate a camera--

Column 26, Claim 13, Line 28, delete ":" and insert therefor --;--

Column 26, Claim 13, Line 33, delete "a camera compensation" and insert therefor --a camera compensation,--

Signed and Sealed this
Twentieth Day of August, 2024

Katherine Kelly Vidal
*Director of the United States Patent and Trademark Office*